US008447496B2

(12) United States Patent
Krengel et al.

(10) Patent No.: US 8,447,496 B2
(45) Date of Patent: *May 21, 2013

(54) FUEL-BASED INJECTION CONTROL

(75) Inventors: Eric Krengel, Dearborn, MI (US); Peter C. Moilanen, Clinton, MI (US); Gopichandra Surnilla, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 343 days.

This patent is subject to a terminal disclaimer.

(21) Appl. No.: 12/885,208

(22) Filed: Sep. 17, 2010

(65) Prior Publication Data

US 2011/0184629 A1    Jul. 28, 2011

(51) Int. Cl.
*F02D 41/30* (2006.01)
*F02M 43/00* (2006.01)

(52) U.S. Cl.
USPC .......................................... 701/103; 123/304

(58) Field of Classification Search
USPC .................. 701/105, 113; 123/1 A, 285, 299, 123/406.11, 406.47, 575, 576, 304
See application file for complete search history.

(56) References Cited

U.S. PATENT DOCUMENTS

| | | | | |
|---|---|---|---|---|
| 5,170,759 A | * | 12/1992 | Ito | 123/276 |
| 5,458,102 A | * | 10/1995 | Tomisawa et al. | 123/435 |
| 5,636,614 A | * | 6/1997 | Morikawa | 123/435 |
| 5,881,693 A | * | 3/1999 | Mizuno | 123/295 |
| 6,044,642 A | | 4/2000 | Nishimura et al. | |
| 6,267,097 B1 | * | 7/2001 | Urushihara et al. | 123/305 |
| 6,293,246 B1 | * | 9/2001 | Tanahashi et al. | 123/305 |
| 6,354,264 B1 | * | 3/2002 | Iwakiri et al. | 123/305 |
| 6,401,688 B2 | * | 6/2002 | Teraji et al. | 123/295 |
| 6,557,532 B1 | | 5/2003 | Nakayama et al. | |
| 6,725,829 B2 | | 4/2004 | Kataoka et al. | |
| 7,051,701 B2 | | 5/2006 | Tomita | |
| 7,171,953 B2 | | 2/2007 | Altenschmidt | |
| 7,219,650 B2 | | 5/2007 | Nagano et al. | |
| 7,287,509 B1 | | 10/2007 | Brehob | |
| 7,370,629 B2 | | 5/2008 | Kohler et al. | |
| 7,426,908 B2 | * | 9/2008 | Brehob | 123/25 C |
| 7,475,683 B2 | | 1/2009 | Kokubu | |
| 7,523,744 B2 | | 4/2009 | Ayame | |
| 7,721,710 B2 | * | 5/2010 | Leone et al. | 123/431 |
| 7,793,637 B2 | * | 9/2010 | Strom et al. | 123/304 |
| 8,132,555 B2 | * | 3/2012 | Lewis et al. | 123/305 |
| 8,165,788 B2 | * | 4/2012 | Surnilla et al. | 701/113 |
| 2001/0045200 A1 | * | 11/2001 | Urushihara et al. | 123/295 |
| 2009/0314260 A1 | | 12/2009 | Maeda et al. | |

FOREIGN PATENT DOCUMENTS

WO    2008015560 A2    2/2008

OTHER PUBLICATIONS

Surnilla, et al., "Fuel-Based Injection Control" U.S. Appl. No. 12/470,652, filed May 22, 2009; FGT093010, 35 Pgs.

* cited by examiner

*Primary Examiner* — Stephen K Cronin
*Assistant Examiner* — Arnold Castro
(74) *Attorney, Agent, or Firm* — Julia Voutyras; Alleman Hall McCoy Russell & Tuttle LLP

(57) ABSTRACT

Systems and methods of operating an engine with a varying fuel composition. In one example, a split injection is performed during engine cranking with at least some fuel injected in the intake stroke and some fuel injected in the compression stroke. Further, a split ratio of the injection is adjusted based on the alcohol content of the injected fuel.

20 Claims, 4 Drawing Sheets

FUEL-BASED INJECTION CONTROL

FIELD

The present application relates to methods and systems for controlling a fuel injection of an internal combustion engine operating with fuel of varying composition.

BACKGROUND AND SUMMARY

Alternate fuels have been developed to mitigate the rising prices of conventional fuels and for reducing production of regulated emissions, such as $CO_2$. For example, alcohol and alcohol-based fuel blends have been recognized as attractive alternative fuels, in particular for automotive applications. Various engine systems may be used with alcohol fuels, utilizing various engine technologies such as turbo-chargers, super-chargers, etc. Further, various approaches may be used to control such alcohol-fuelled engines, including adjustment of boost or spark timing in dependence upon an alcohol content of the engine fuel, and various other engine operating conditions.

One example approach to control alcohol-fuelled engines is described by Brehob in U.S. Pat. No. 7,287,509. Herein, the injection timing of a directly injected alcohol fuel is adjusted to take advantage of the increased charge cooling effects of the alcohol fuel's higher heat of vaporization and increased octane. Specifically, the injection timing of one or more direct injections is advanced with increased alcohol in the fuel to take advantage of the higher latent enthalpy of vaporization of alcohol and to allow more time for vaporization. Further, in some embodiments involving multiple injections, a larger amount of fuel is injected in an earlier injection (such as in an intake stroke) while a smaller amount of fuel is injected in a later injection (such as in a compression stroke or exhaust stroke). By advancing the injection timing, and/or injecting a larger fraction of fuel in an earlier injection, the intake system is cooled to enable the charge density that can be rammed into the combustion chamber to be increased. Overall, the charge cooling effect of the alcohol fuel is used to improve the peak torque output of the engine.

However, the inventors herein have recognized potential issues with such an approach. In one example, during an engine cold-start, when the temperature conditions of the engine are already not hot enough for an efficient combustion, advancing the injection timing responsive to an increase in fuel alcohol content may further cool the system and significantly reduce the efficiency of fuel evaporation and the formation of a homogeneous air-fuel mixture. Injecting a larger fraction of fuel in an earlier injection may further degrade fuel evaporation efficiency. The larger amount of time required to evaporate the fuel may degrade engine startability. Additionally, the charge cooling effect of the alcohol fuel on the intake system may further lower the air-charge temperature at cold-start conditions thereby further degrading combustion stability and increasing potential for engine misfire. As such, this may lead to reduced fuel economy and degraded cold-start exhaust emissions.

Thus in one example, some of the above issues may be addressed by a method of operating an engine cylinder including a direct fuel injector. In one embodiment, the method comprises, during an engine cold start, direct injecting at least some fuel in an intake stroke of the engine and at least some fuel in a compression stroke of the engine, and decreasing a ratio of intake stroke fuel to compression stroke fuel as an alcohol content of the injected fuel increases.

In one example, the engine may be a flex-fuel engine of a vehicle configured with direct fuel injection. During an engine cold-start, when operating the engine with an alcohol-blended fuel, such as during a first number of combustion events from the start of engine rotation, a split fuel injection may be performed with at least some fuel injected in the intake stroke of the cylinder and at least some fuel injected in the compression stroke of the cylinder. The split ratio of the injections, for example, a ratio between an amount of fuel injected in the first intake stroke and an amount of fuel injected in the second compression stroke, may be adjusted based on the alcohol content of the injected fuel. As such, the split ratio may have a value between 0 and 1. Herein, the ratio of intake stroke fuel to compression stroke fuel may be decreased as the alcohol content of the fuel increases. While the split ratio is decreased, the injections may be adjusted so that a start of injection timing in the intake stroke and an end of injection timing in the compression stroke is maintained, even as the alcohol content of the fuel changes, the split ratio changes, and the total amount of fuel injection changes.

The number of combustion events, at engine cranking, over which the split injection with the decreasing split ratio is performed may also be adjusted based on the alcohol content of the fuel. Similarly, a number of engine cylinders for which split fuel injection with the decreasing split ratio is performed may also be adjusted based on the alcohol content of the fuel. In one example, one or more of the number of combustion events since the beginning of engine rotation and the number of engine cylinders may be increased as the alcohol content of the injected fuel increases.

In one example, when operating with a fuel-blend with a lower percentage of alcohol (such as E10, which has approximately 10% ethanol and 90% gasoline), the split ratio may be higher, for example, closer to 1, so that a larger amount of fuel may be injected in the intake stroke while a smaller amount of fuel is injected in the compression stroke. In another example, when operating with a fuel-blend with a higher percentage of alcohol (such as E70, which has approximately 70% ethanol and 30% gasoline), the split ratio may be lower, for example, closer to 0, so that a smaller amount of fuel may be injected in the intake stroke while a larger amount of fuel is injected in the compression stroke). Further, the number of compression stroke injections may be increased as the compression stroke injection amount exceeds a threshold.

By performing multiple injections and adjusting the split ratio of the multiple injections based on the alcohol content of the injected fuel, engine combustion, particularly during engine cranking, may be improved while reducing particulate matter emissions. Specifically, by increasing the proportion of fuel injected in the compression stroke as the alcohol content of the fuel increases, the higher air-charge temperature and higher valve temperature of the engine cylinders during the compression stroke may be advantageously used to more effectively evaporate the directly injected alcohol fuel and form a homogenous air-fuel mixture. In this way, the engine's ability to start with alcohol fuels may be improved. Additionally, by evaporating most of the injected fuel, less fuel may be lost during engine operation, and the need for larger or pilot fuel injections at engine cold-start may be reduced or eliminated. As such, this may provide fuel economy benefits as well as reduced cold-start exhaust emissions. Finally, by maintaining the start of injection timing of the intake injection and the end of injection timing of the compression injection, it is possible to maintain repeatable engine speed profiles.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
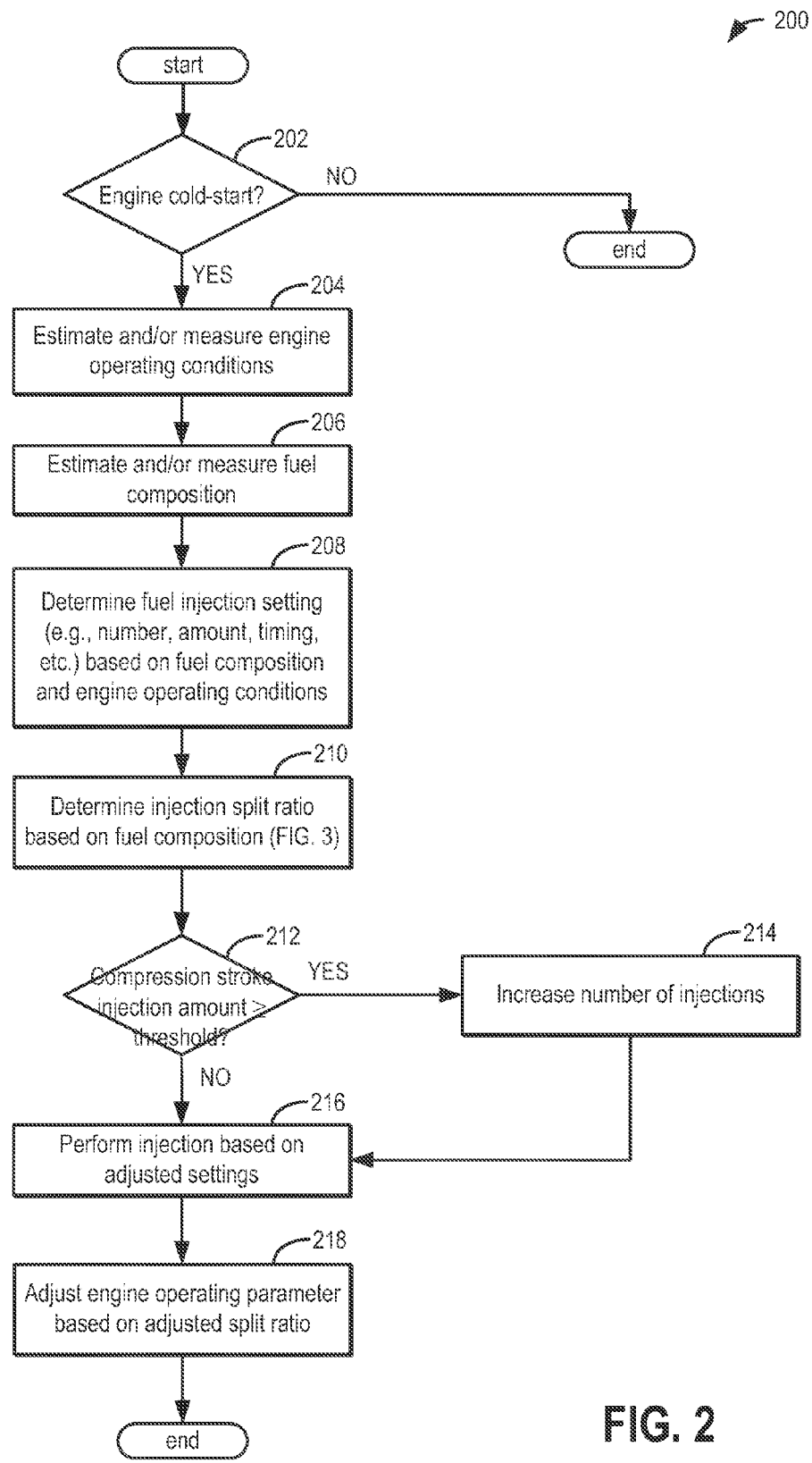
FIG. 2 shows a high level flow chart illustrating a routine that may be implemented for adjusting the split ratio of a direct fuel injection responsive to fuel composition.
Figure 3:
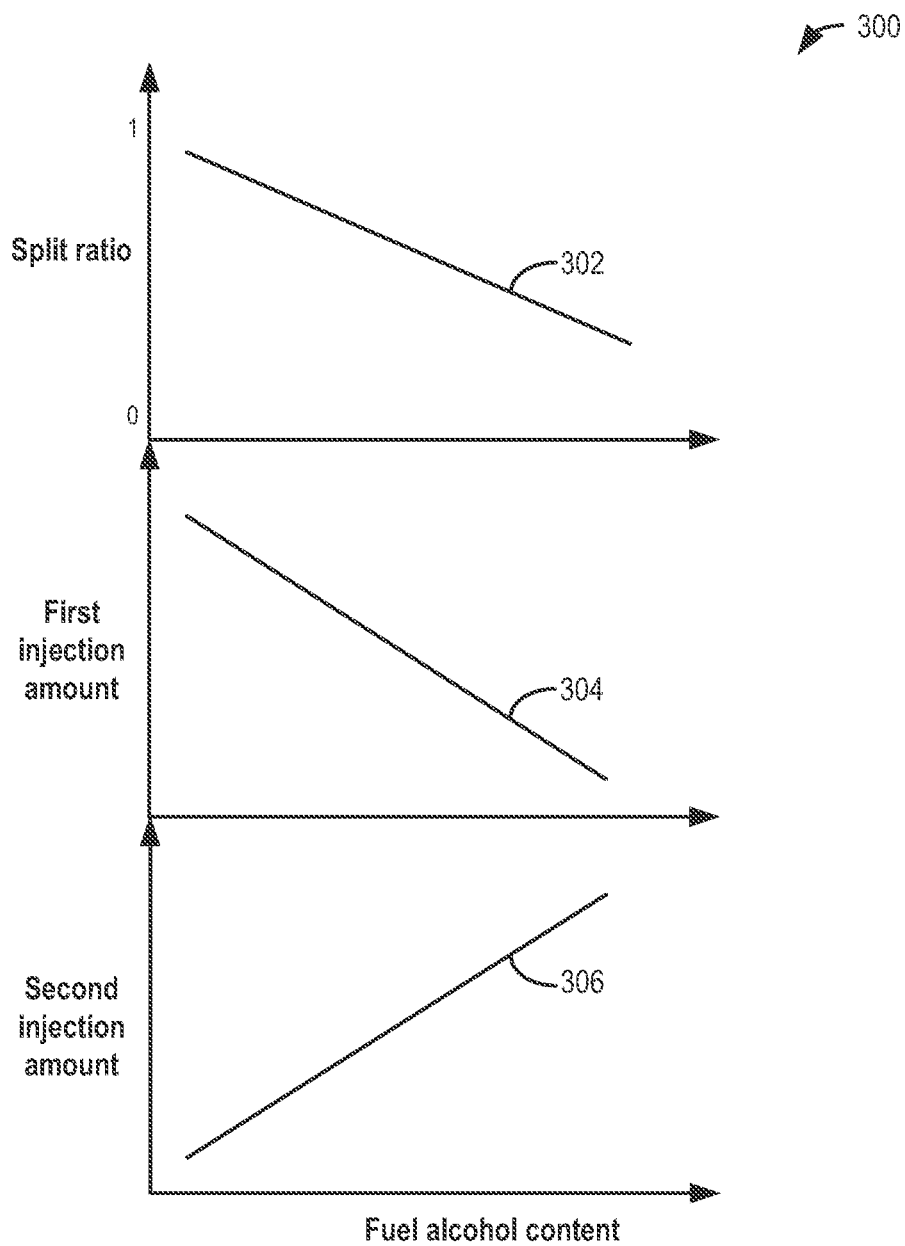
FIG. 3 shows a map depicting variations in injection split ratio with fuel alcohol content.
Figure 4:
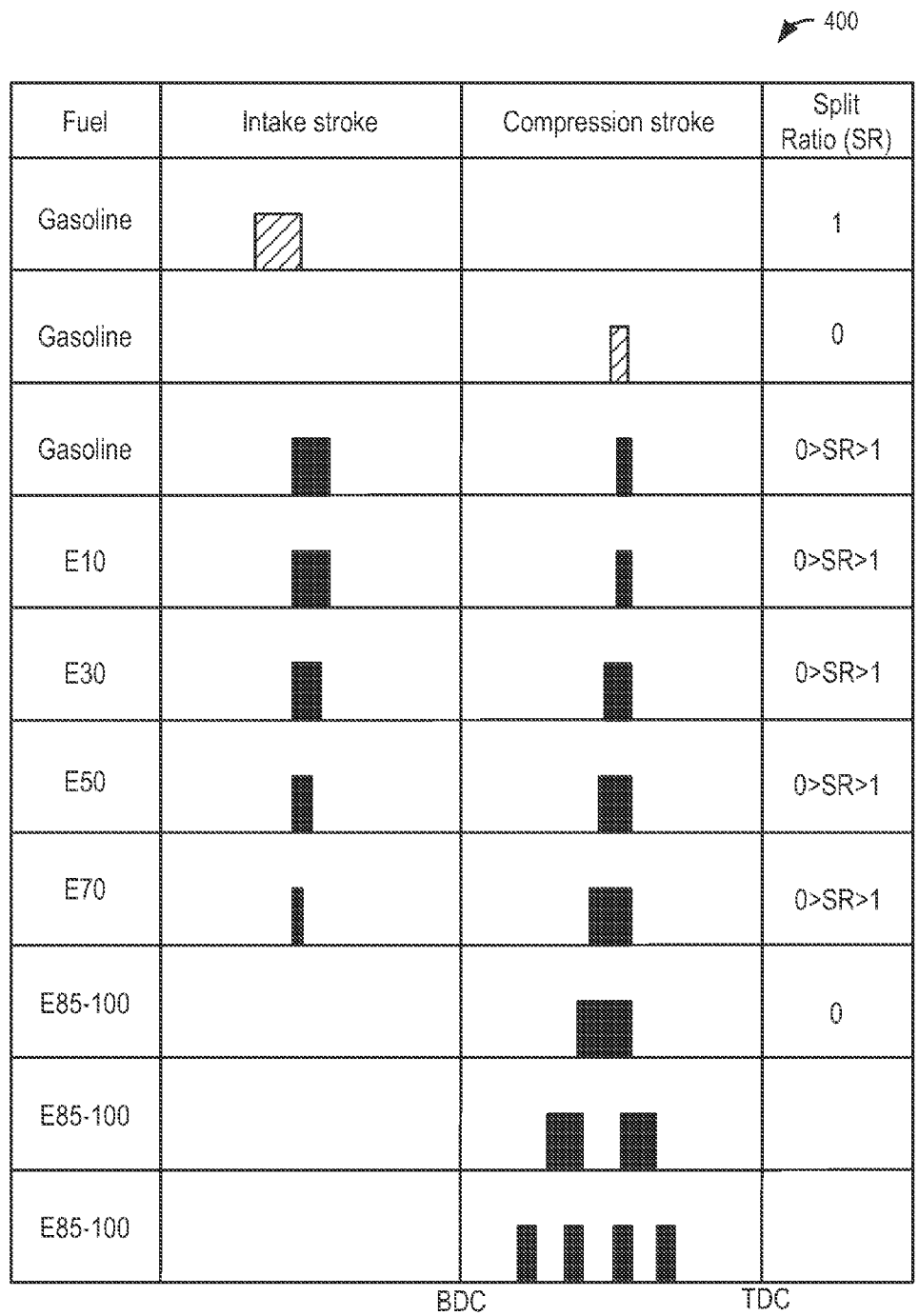
FIG. 4 shows a fuel injection chart with example variations in injection split ratio for fuels with differing alcohol content.

The following description relates to systems and methods for improving an engine's ability to start with alcohol based fuels (such as the engine of FIG. 1) at ambient temperatures (cold-start). An engine controller may be configured to perform a control routine, such as depicted in FIG. 2, during an engine cold start, to adjust the split ratio of the amount of fuel injected during an intake stroke to an amount injected during a compression stroke of the engine responsive to the fuel composition, for example, the fuel alcohol content. By decreasing the ratio of intake stroke fuel to compression stroke fuel as the fuel alcohol content increases, as depicted in FIGS. 3-4, fuel evaporation and formation of a homogeneous air-fuel mixture at cold-start may be improved, without the need for pilot fuel injections. By reducing fuel losses incurred during cold-start, the fuel efficiency and quality of vehicle cold-start exhaust emissions may be significantly improved.

Figure 1:
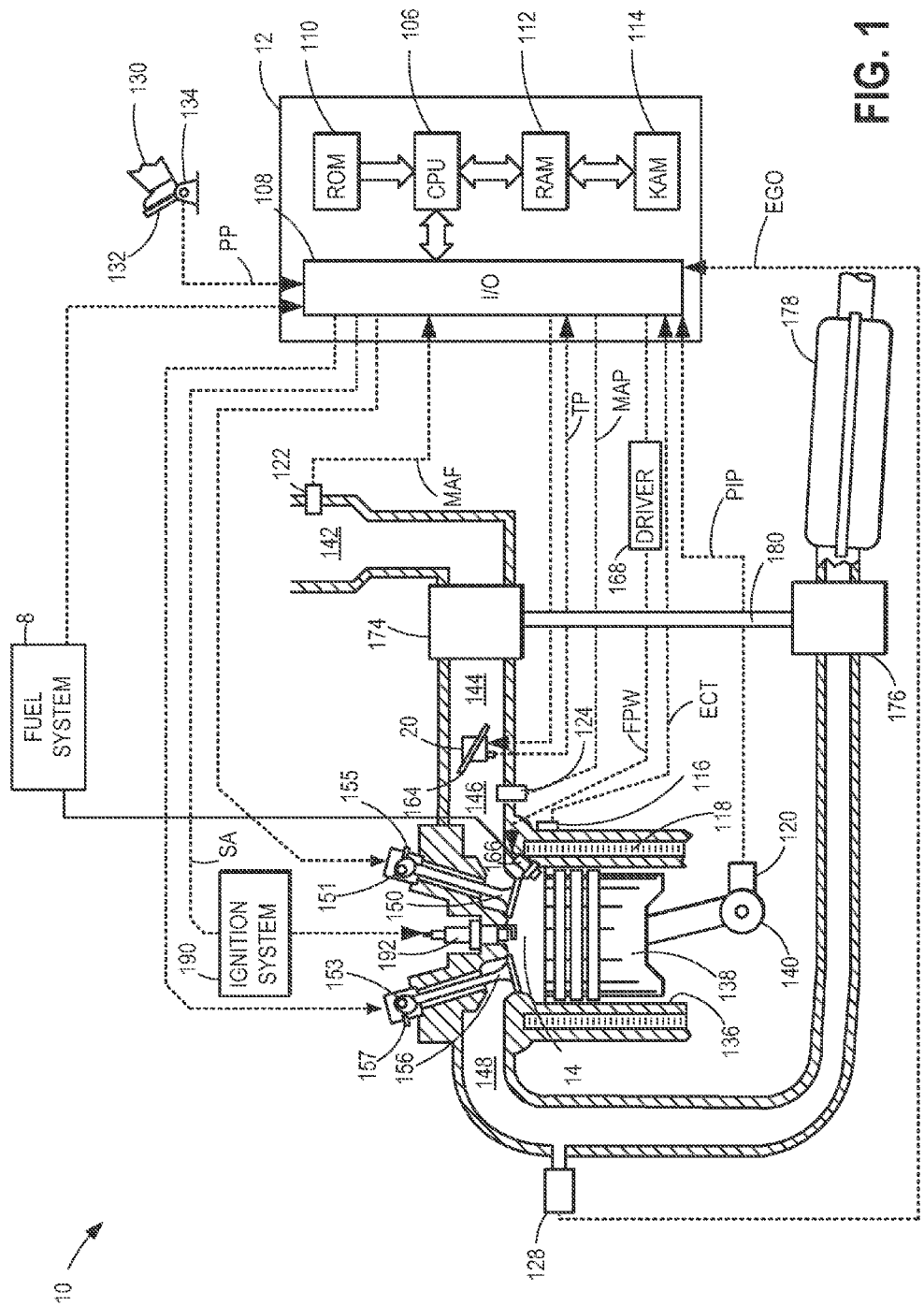
FIG. 1 shows an example embodiment of a combustion chamber operating with a direct fuel injector.

FIG. 1 depicts an example embodiment of a combustion chamber or cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including one fuel injector 166. Fuel injector 166 is shown coupled directly to cylinder 14 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 14.

It will also be appreciated that while in one embodiment, the engine may be operated by injecting the variable fuel blend via a single direct injector; in alternate embodiments, the engine may be operated by using two injectors (a direct injector and a port injector) and varying a relative amount of injection from each injector.

Fuel may be delivered by the injector to the cylinder during a single cycle of the cylinder. Further, the distribution and/or relative amount of fuel delivered from the injector may vary with operating conditions, such as air charge temperature, as described herein below. Furthermore, for a single combustion event, multiple injections of the delivered fuel may be performed per cycle. The multiple injections may be performed during the compression stroke, intake stroke, or any appropriate combination thereof.

As described above, FIG. 1 shows only one cylinder of a multi-cylinder engine. As such each cylinder may similarly include its own set of intake/exhaust valves, fuel injector(s), spark plug, etc.

Fuel tanks in fuel system 8 may hold fuel with different fuel qualities, such as different fuel compositions. These differences may include different alcohol content, different octane, different heat of vaporizations, different fuel blends, and/or combinations thereof etc. In one example, fuels with different alcohol contents could include one fuel being gasoline and the other being ethanol or methanol. In another example, the engine may use gasoline as a first substance and an alcohol containing fuel blend such as E85 (which is approximately 85% ethanol and 15% gasoline) or M85 (which is approximately 85% methanol and 15% gasoline) as a second substance. Other alcohol containing fuels could be a mixture of alcohol and water, a mixture of alcohol, water and gasoline, a mixture of ethanol, methanol and water, etc. In still another example, both fuels may be alcohol blends wherein the first fuel may be a gasoline alcohol blend with a lower ratio of alcohol than a gasoline alcohol blend of a second fuel with a greater ratio of alcohol, such as E10 (which is approximately 10% ethanol) as a first fuel and E85 (which is approximately 85% ethanol) as a second fuel. Additionally, the first and second fuels may also differ in other fuel qualities such as a difference in temperature, viscosity, octane number, latent enthalpy of vaporization etc.

Moreover, fuel characteristics of the fuel tank may vary frequently. In one example, a driver may refill the fuel tank with E85 one day, and E10 the next, and E50 the next. The day to day variations in tank refilling can thus result in frequently varying fuel compositions, thereby affecting the fuel composition delivered by injector 166.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold.

Storage medium read-only memory 110 can be programmed with computer readable data representing instructions executable by processor 106 for performing the methods described below as well as other variants that are anticipated but not specifically listed.

FIG. 2 describes an example control system routine 200 for adjusting a split ratio of a direct fuel injection responsive to fuel composition. Specifically, based on engine operating conditions, an amount of fuel may be injected either as a single direct fuel injection a multiple direct fuel injection. In one example, the multiple injections may include injecting at least some fuel in the intake stroke and injecting at least some fuel in the compression stroke. The split ratio of fuel injected in the compression stroke to the intake stroke may be adjusted based on fuel composition. By adjusting the split ratio responsive to the alcohol content of the fuel, the evaporation of the fuel and the mixing of the fuel with air may be improved, thereby improving the quality of the combustion event, and an engine's ability to start.

At 202, it may be confirmed whether the engine is in a cold-start condition. In one example, an engine cold-start may be confirmed if the engine temperature is below a threshold temperature and/or a threshold duration since a previous engine shutdown has elapsed. If an engine cold-start is not confirmed, the routine may end. Upon confirmation, at 204, the engine operating conditions may be measured and/or estimated. These may include an engine speed, an air charge temperature, a manifold pressure, barometric pressure, etc. At 206, the fuel alcohol content and/or fuel composition may be determined. In one example, the fuel composition may be determined based on a previous engine operation. In another example, the fuel composition may be determined based on a fuel tank filling event. Alternatively, the fuel composition may be determined based on the output of a fuel composition sensor, such as a fuel alcohol sensor.

At 208, a fuel injection setting may be determined based on the estimated engine operating conditions, and further based on the fuel composition. The fuel injection settings determined may include an amount of fuel to be injected during the combustion event, whether the injected amount will be injected as a single injection or will be split between multiple injections, as a intake stroke injection or as a compression stroke injection or split between both intake stroke and compression stroke fuel injections. The injection timing in the event of a multiple fuel injection may include details regarding the stroke (intake, compression, exhaust, etc.) in which the fuel may be injected, a start of injection timing and an end of injection timing for each injection, and a duration of each injection. For example, the start of injection timing and/or the end of injection timing may vary with engine speed, load, or other parameters.

At 210 a split ratio for the fuel injection may be determined based on the fuel composition. FIG. 3 shows a map 300 depicting an example change in split ratio (along the y-axis) with variation in fuel alcohol content (along the x-axis). Specifically, line 302 depicts a change in the split ratio between a first injection amount and second amount, line 304 shows the change in the first injection amount, and line 306 depicts the change in the second injection amount. As such, the split ratio (line 302) may have a value ranging between 0 and 1. Thus, a split ratio of 1 or 0 may indicate that all the fuel has been injected as a single fuel injection, while a split ratio between 0 and 1 may indicate that the fuel injection has been split into at least two fuel injections with a first (earlier) injection and a second (later) injection. Therein, a split ratio of 1 may indicate that substantially all the fuel has been injected in the first, earlier injection while a split ratio of 0 may indicate that substantially all the fuel has been injected in the second, later injection. Similarly, a split ratio value closer to 1 indicates that a larger fraction of the injected fuel has been injected in the first, earlier injection while a split ratio closer to 0 indicates that a larger fraction of the injected fuel has been injected in the second, later injection. In one example, the different split ratios used at the different fuel alcohol contents may be stored in a look-up table in the controller's memory.

In one example, the first injection amount may represent an amount of fuel injected in an intake stroke of a cylinder while the second injection amount may represent an amount of fuel injected in a compression stroke of the cylinder. As depicted, as the alcohol content of the injected fuel increases, the split ratio (line 302) may decrease. That is, the first fuel injection amount (line 304), for example, an amount of fuel injected in the intake stroke, may decrease while the second injection amount (line 306), for example, an amount of fuel injected in the compression stroke, may correspondingly increase. By increasing the ratio of fuel injected in the second, later injection (for example, in the compression stroke) as the fuel alcohol content increases, the injected alcohol may be injected into air charge of a higher temperature, thereby improving evaporation of the injected fuel. By improving the atomization and mixing of the injected alcohol with the air charge, the engine ability to start may be improved. Furthermore, since substantially all the injected fuel may be evaporated, fuel residuals may be reduced, thereby improving engine cold-start exhaust emissions.

As such, an amount of fuel injected during the combustion event may be based on, among other parameters, the intake air charge (amount, temperature, pressure, etc.) which in turn is based on the fuel composition (e.g., alcohol content) of the injected fuel. Thus, as the alcohol content of the injected fuel increases, the amount of fuel injected may also increase. For a fuel of a given alcohol content, the determined amount of fuel may be injected as a single injection or split into multiple (for example, two) injections. As such, the sum of the amount of fuel injected in the multiple injections will remain the same as the amount of fuel injected in the single injection. Thus, in one example, during an engine cold start, a single fuel injection may be performed in the intake stroke. In another example, the single fuel injection of the fuel may be performed in the compression stroke. In still another example, the amount of fuel injected in the single injection may be split into a first injection of a first amount in the intake stroke and a second injection of a second amount in the compression stroke, wherein the sum of the first and second amount may equal the amount of fuel injected in the single injection.

The sum of the amount of fuel injected in the intake stroke and the compression stroke may increase as the alcohol content of the fuel increases. Further, the split ratio may also be adjusted based on the fuel's alcohol content. As further illustrated with reference to the example injection settings of FIG. 4, as a fuel alcohol content of the injected fuel increases, for a given engine speed, a controller may be configured to inject a larger proportion of a determined injection amount in the second, later injection (such as, in the compression stroke) while injecting a smaller proportion of the determined injection amount in the first, earlier injection (such as, in the intake stroke).

Returning to FIG. 2, at 212, it may be determined whether any of the injections are in the compression stroke, and if so, whether the compression injection amount is greater than an injection threshold. In one example, the compression injection amount may be greater than a maximum amount that can be dispensed by the injector in a single injection. In another example, the compression injection amount may be greater than a threshold amount within engine combustion stability limits. If the compression injection amount is above the threshold, then at 214, the number of compression injections may be increased and an engine controller may determine that multiple compression injections are to be performed per cylinder and proceed to 216.

In one example, the controller may split the initial compression injection amount into a double symmetric compression injection wherein the amount injected per compression injection may be adjusted to half the value of the initial compression injection setting. Additionally, the timing of the two injections may be adjusted such that the average timing of the two compression injections is the same as the initial single compression injection setting. If required, the duty cycle and frequency of the fuel injector may also be accordingly adjusted. Specifically, the time of opening and closing of the fuel injector in the compression stroke may be adjusted (e.g., decreased) and the timing in between the multiple compression injections may be adjusted (e.g. increased) as the number of injections is increased. In this way, by increasing the number of injections, the determined compression injection amount may be injected in multiple installments without adversely affecting the engine's performance. If the compression injection amount is not above the threshold at 212, and/or after the number of compression injections is increased at 214, the routine may proceed to 216 wherein fuel injection may be performed according to the determined settings.

At 218, based on the adjusted split ratio, one or more engine operating parameters may be adjusted. In one example, ignition spark timing may be adjusted based on the adjusted split ratio. For example, the ignition spark timing may be retarded as the split ratio is decreased. In another example, fuel rail pressure may be adjusted based on the adjusted split ratio.

In one example, during a first engine cold-start, for example, on a first day when the fuel tank is filled with a first fuel blend of lower alcohol content, at least some of the first fuel may be direct injected in the intake stroke of an engine cylinder and at least some of the first fuel may be injected in the compression stroke of the engine cylinder at a first split ratio of intake stroke fuel to compression stoke fuel. In comparison, during a second engine cold-start, for example, on a second day when the fuel tank is filled with a second fuel that has a higher alcohol content than the first fuel injected during the first engine cold-start, at least some of the second fuel may be direct injected in the intake stroke of the engine cylinder and at least some of the second fuel may be injected in the compression stroke of the engine cylinder at a second, higher split ratio of intake stroke fuel to compression stoke fuel.

Additionally, the number of combustion events over which the split injection is performed may also be adjusted based on the fuel's alcohol content. For example, during an engine start at an ambient temperature with a first fuel having a lower alcohol content, such as E10 (10% alcohol, 90% gasoline), the number of split direct fuel injection events (that is, the number of combustion events over which the split injection is performed) may be lower while the split ratio for the fuel injection events is higher. In comparison, during an engine start at an ambient temperature with a second fuel having a higher alcohol content, such as E85 (85% alcohol, 15% gasoline), the number of split direct fuel injection events (that is, the number of combustion events over which the split injection is performed) may be higher while the split ratio for the fuel injection events is lower. Additionally, or optionally, the number of cylinders in which the split injection is performed may be adjusted (e.g., increased) as the fuel alcohol content increases. For example, during the first engine cold-start, the direct injection at the first (lower) split ratio may be performed in a first number of engine cylinders, while during the second engine cold-start, the direct injection at the second (higher) split ratio may be performed in a second, higher, number of engine cylinders.

In one example, the engine is a 6 cylinder engine. As one example, during the first engine cold start, direct injection at the first lower split ratio may be performed in all engine cylinders for the first two combustion events. In comparison, during the second engine cold start, direct injection at the second higher split ratio may be performed in all engine cylinders for the first four combustion events. Herein, a larger number of combustion events may be required to raise the cylinder air-charge temperature sufficiently high to enable proper vaporization of the higher alcohol content fuel. Following the fourth combustion event, the split injection may be disabled since, by then, each cylinder may have had at least one combustion event and thus the residual heat in the cylinder may be enough to vaporize the alcohol fuel sufficiently, even at high alcohol amounts.

In another example, during the first engine cold start, direct injection at the first lower split ratio may be performed in three cylinders of the engine for the first three combustion events while during the second engine cold start, direct injection at the second higher split ratio may be performed in all (six) engine cylinders for the first six combustion events. Herein, a larger number of cylinders may require the split injection to raise the cylinder air-charge temperature sufficiently high to enable proper vaporization of the higher alcohol content fuel. Still other combinations of number of cylinders and number of cylinder events may be possible.

Following the predetermined number of combustion events, the split ratio may be readjusted, for example, the split fuel injection may be transitioned back to a single fuel injection (in the intake stroke only, or in the compression stroke only). During the transition out of the split injection, one or more engine operating parameters (e.g., spark timing, boost, etc.) may be adjusted based on the transition. As one example, when an engine is transitioning from a split injection to a single intake injection, both the spark timing and the throttle may be adjusted. As another example, when an engine is transitioning from split to compression only injection, only spark timing may be adjusted.

While the above example illustrates performing a split injection during cranking for a predetermined number of combustion events, it will be appreciated that in an alternate example, the split injection may be initiated at cranking only after a predetermined number of combustion events have elapsed. For example, at cranking, a single fuel injection (in the intake stroke only, or in the compression stroke only) may be performed for a first predetermined number of combustion events, after which, the split fuel injection may be transitioned in and performed for a second different predetermined number of combustion events. In one example, split fuel injection may not enable during the first and second injection from engine start due to low injection pressure. Split fuel injection may only be enabled after the first two injections have elapsed, that is, for the third, fourth, fifth and sixth injection from the engine start due to the injection pressure having built up by the third injection. In one example, at lower ambient temperatures (e.g., less then 0° C.), following the sixth injection, split fuel injection may be disabled since, by then, each cylinder may have had at least one combustion event and thus the reduced heat loss due to the increased speed of the compression and the residual heat in the cylinder may be enough to vaporize the alcohol fuel sufficiently, even at high alcohol amounts. As during the transitioning out, during the transitioning in of the split fuel injection, one or more engine operating parameters (e.g., spark timing, boost, etc.) may be adjusted based on the transition. In one example, during an engine start at lower ambient temperatures, when transitioning from a single compression only injection to a split injection, both the compression injection timing and the spark timing may be adjusted.

In this way, the split ratio of fuel injections may be adjusted responsive to a fuel alcohol content, to improve the evaporation of the fuel during engine cold-start conditions and thus improve the engine's ability to start. Specifically, by increasing the proportion of compression injection fuel (and optionally the number of compression injections), while decreasing the proportion of intake injection fuel as fuel alcohol content increases, an improved fuel evaporation may be achieved during engine start for fuels with low volatility.

FIG. 4 depicts an example fuel injection timing chart 400 with example variations in fuel injection settings, including split ratio (SR), for fuels with differing alcohol content. It will be appreciated that the depicted examples represent example scenarios wherein engine operating parameters (such as engine speed, load, etc.) are the same, and wherein the fuel alcohol content varies. Accordingly, as previously elaborated with reference to FIGS. 2-3, the split ratio of fuel injected in a first (earlier) injection to fuel injected in a second (later) injection is adjusted based on the alcohol content of the injected fuel. As such, the split ratio may have a value ranging between 0 and 1.

In the first example, the engine is operated with gasoline only. Herein, a single fuel injection may be performed with a split ratio of 1. As depicted, all the fuel may be injected as a single injection in the intake stroke (hatched bar). Since gasoline is a high volatility fuel, a lower engine temperature may suffice to evaporate the fuel. Thus, an intake stroke injection may enable efficient air-fuel mixing. In the second example, the fuel injection of a gasoline fuel is performed with the split ratio set at 0. Thus, as depicted, all the fuel may be injected as a single injection in the compression stroke (hatched bar). As indicated by the difference in the width of the hatched bars, due to the higher cylinder temperature in the compression stroke, a smaller amount of gasoline fuel may need to be injected during the single fuel injection in the compression stroke (that is, with SR=0) as compared to the single fuel injection in the intake stroke (that is, with SR=1). In the third example, the gasoline fuel injection is split into two injections with a split ratio between 0 and 1 (herein, closer to 1 than 0) such that a larger portion of the gasoline fuel injection amount is injected during the intake stroke and the remaining smaller portion of the gasoline fuel injection amount is injected during the compression stroke. In one example, a single fuel injection of gasoline in the intake stroke may be used when the when the engine is a stabilized operation temperatures, while the single fuel injection of gasoline in the compression stroke may be used when the engine is significantly below normal operating temperatures. In comparison, the split fuel injection of the gasoline fuel may be used when it is desirable to retard spark to increase the exhaust temperatures. In still another example, a split ratio of the injections may be gradually transitioned (over a predetermined number of combustion events) from a split ratio of 0 to 1, or 1 to 0. As previously elaborated, during a transition of the fuel injection from a single injection (that is, with a split ratio of either 0 or 1) to a split injection (that is, with a split ratio between 0 and 1), one or more engine operating parameters (such as spark timing, boost, etc.) may be adjusted to compensate for torque disturbances.

In the fourth example, the engine is operated with an ethanol fuel blend of lower alcohol content, such as E10. Herein, a fuel injection (solid bars) may be performed with a split ratio between 0 and 1 (herein, closer to 0 than 1) such that a larger portion of the E10 fuel injection amount is injected during the intake stroke and the remaining smaller portion of the E10 fuel injection amount is injected during the compression stroke. As such, a smaller portion of the E10 fuel is injected during the intake stroke as compared to the portion of gasoline fuel injected during the intake stroke in the preceding example (that is, the third example illustration a split fuel injection for gasoline fuel). Since ethanol is a low volatility fuel, a higher engine temperature may be required to evaporate the fuel, particularly at cold ambient starts. Thus, at least some of the fuel is injected in the compression stroke to take advantage of the compression stroke's higher cylinder valve temperature and air charge temperature. The fifth, sixth, and seventh examples depict example fuel injections for engines operating with fuel having progressively higher fuel alcohol content. As shown, in each case a split injection may be performed (solid bars) with a split ratio between 0 and 1. Furthermore, as the alcohol content of the injected fuel increases (going from E10 to E70), the split ratio may be gradually decreased such that the intake stroke injection amount is decreased while the compression stroke injection amount is correspondingly increased. By increasing the amount of fuel injected in the compression stroke, as compared to the intake stroke, fuel atomization and engine's ability to start particularly at cold ambient temperatures may be improved.

The split ratio of the injections may be adjusted such that a start of injection timing of the intake stroke fuel injection amount (as depicted by the left margin of the first solid bar) and an end of injection timing of the compression stroke fuel injection amount (as depicted by the right margin of the second solid bar) is maintained while the split ratio is decreased. As such, one or more of the following start of injection timing of the intake stroke, intake fuel injection amount, the end of injection timing for the compression stroke, and the compression fuel injection amount may be determined based on engine operating parameters, such as a given engine speed/load condition or desired spark. However, for a given engine speed/load condition (or other engine operating parameter), as the alcohol content of the injected fuel changes and the split ratio is corresponding adjusted, the start of injection timing of the intake fuel injection, and the end of injection timing for the compression fuel injection is maintained.

It will be appreciated that while the depicted examples show the fuel injection split between an intake stroke fuel injection and a compression stroke fuel injection, this is not meant in a limiting sense. In alternate embodiments, the split ratio may represent the distribution of a fuel injection between a first, earlier injection and a second, later injection. For example, in an alternate embodiment, the first injection may be in the compression stroke while the second injection is in the exhaust stroke. In still other examples, the multiple injections may be in the same stroke.

The eighth example shows an example wherein the engine is operated with an ethanol blend of higher alcohol content, such as E85 to E100. Herein, a single fuel injection may be performed with the split ratio set at 0, that is, with all the fuel injected in the compression stroke. However, if the injection amount exceeds a threshold (such as a threshold amount that can be dispensed by the injector in a single injection), the injection amount in the compression stroke may be split into multiple compression injections. As depicted in the ninth example, when operating with E85-E100, a double compression injection may be performed, the amount of the two injections adjusted to half the value of the preceding single compression injection setting (as depicted by the width of the narrower solid bars) to enable a symmetric double compression injection (although an asymmetric injection may alternately be performed). The timing of the two injections may also be adjusted so that the fuel amount delivered by the two injections is the same as that of the preceding single compression injection setting. Further still, the duration of opening and closing of the fuel injector may be decreased (as depicted by narrower solid bars) and the timing in between the two injections may be increased.

The tenth example illustrates a quadruple compression injection instead of the previous single compression injection. Herein, the amount of the four injections is adjusted to a fourth of the value of the previous single compression injection setting (as depicted by the width of the narrower solid bars) to enable a symmetric quadruple compression injection (although an asymmetric injection may alternately be performed). The timing of the four injections may also be adjusted so that the fuel amount delivered by the four injections is the same as that of the initial single compression injection setting. Further still, the duration of opening and closing of the fuel injector may be decreased (as depicted by narrower solid bars) and the timing in between the four injections may be increased. It will be appreciated that in all the depicted examples, the fuel injection may precede an ignition event.

In this way, by adjusting the split ratio of a fuel injection responsive to the alcohol content of the fuel, improved evaporation and atomization of the fuel may be enabled, and fuel losses at engine cold-start may be reduced. By enhancing the engines' ability to start with alcohol based fuels at cold temperature conditions, the need for additional hardware, such as heated injectors, or additional steps, such as pilot fuel injections, may be reduced. Additionally, the quality of cold-start exhaust emissions may be improved. By improving the mixing of air and fuel during combustion events, the efficiency of combustion may be improved, leading to potential fuel economy benefits.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various steps, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into the computer readable storage medium in the engine control system.

It will be further appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of operating an engine cylinder including a direct fuel injector, comprising,
during an engine cold start,
direct injecting at least some fuel in a compression stroke of the engine and at least some fuel in an intake stroke of the engine; and
decreasing a ratio of intake stroke fuel to compression stroke fuel as an alcohol content of the injected fuel increases.

2. The method of claim 1 wherein decreasing a ratio of intake stroke fuel to compression stroke fuel includes decreasing an amount of fuel injected in the intake stroke while correspondingly increasing an amount of fuel injected in the compression stroke.

3. The method of claim 2, wherein a sum of the amount of fuel injected in the intake stroke and the amount of fuel injected in the compression stroke is based on an intake air charge, and wherein the sum increases as the alcohol content of the injected fuel increases.

4. The method of claim 1, wherein the decreasing a ratio is performed for a first number of engine cylinders for a second number of combustion events from a beginning of engine rotation, one or more of the first number and second number adjusted based on the alcohol content of the injected fuel.

5. The method of claim 1, further comprising, adjusting one or more of an ignition spark timing and a fuel rail pressure based on the decreased ratio.

6. The method of claim 5, wherein the adjustment includes retarding ignition spark timing based on the decreased ratio.

7. The method of claim 1, wherein an engine operating parameter is adjusted based on the decreased ratio.

8. The method of claim 1, further comprising, maintaining a start of injection timing of the intake stroke fuel injection and maintaining an end of injection timing of the compression stroke fuel injection while decreasing the ratio.

9. The method of claim 2, further comprising, increasing a number of injections in the compression stroke if the amount of fuel injected in the compression stroke exceeds a threshold.

10. A method of operating an engine including an injector configured to directly inject fuel into an engine cylinder, comprising:
during a first engine cold start, direct injecting a first fuel in an intake stroke of the engine and a compression stroke of the engine at a first split ratio of intake stroke fuel to compression stroke fuel; and
during a second engine cold start, direct injecting a second fuel in the intake stroke of the engine and the compression stroke of the engine at a second, lower split ratio of intake stroke fuel to compression stroke fuel, the second fuel having a higher alcohol content than the first fuel.

11. The method of claim 10, wherein during the first engine cold start, the direct injection at the first split ratio is performed for a first number of combustion events from a beginning of engine rotation, and wherein during the second engine cold start, the direct injection at the second split ratio is performed for a second, higher, number of combustion events from the beginning of engine rotation.

12. The method of claim 11, wherein during the first engine cold start, the direct injection at the first split ratio is performed in a first number of engine cylinders, and wherein during the second engine cold start, the direct injection at the second split ratio is performed for a second, higher, number of engine cylinders.

13. The method of claim 11, wherein during the first and second engine cold start, an ignition spark timing is adjusted based on the split ratio of the direct injection.

14. The method of claim 13, wherein during the first engine cold start, direct injecting the first fuel in the intake stroke includes initiating direct injection in the intake stroke at a first timing, and direct injecting the first fuel in the compression stroke includes terminating direct injection in the compression stroke at a second timing; and wherein during the second engine cold start, direct injecting the second fuel in the intake stroke includes initiating direct injection in the intake stroke at the first timing, and direct injecting the first fuel in the compression stroke includes terminating direct injection in the compression stroke at the second timing.

15. An engine system coupled to a vehicle, comprising:
an engine with one or more cylinders;
a direct injector coupled to an engine cylinder; and
a controller with computer readable storage medium having code therein, the code including instructions for, direct injecting an amount of fuel into the engine cylinder, the injection amount split between at least an injection during a compression stroke of the engine and at least an injection during an intake stroke of the engine; and decreasing a split ratio of the intake stroke injection amount to the compression stroke injection amount as an alcohol content of the injected fuel increases.

16. The system of claim 15, wherein the direct injection is performed in a first number of cylinders for a second number of combustion events from a beginning of engine rotation, the first number of cylinders and/or the second number of combustion events adjusted based on the alcohol content of the injected fuel.

17. The system of claim 16, wherein the controller further includes code with instructions for increasing a number of injections in the compression stroke as the compression stroke injection amount exceeds a threshold.

18. The system of claim 17, wherein the controller further includes code with instructions for maintaining a start of injection timing for the intake stroke injection and maintaining an end of injection timing for the compression stroke injection as the alcohol content of the injected fuel increases.

19. The system of claim 15, wherein the controller further includes code with instructions for, transitioning from the split direct injection to a single intake injection or a single compression injection; and adjusting one or more of an injection spark timing and a throttle opening based on the transition.

20. The system of claim 15, wherein the controller further includes code with instructions for, transitioning to the split direct injection from a single intake injection or a single compression injection; and adjusting one or more of an injection spark timing and a throttle opening based on the transition.

* * * * *